United States Patent [19]

Kitagishi et al.

[11] Patent Number: 4,639,096
[45] Date of Patent: Jan. 27, 1987

[54] HIGH RANGE ZOOM LENS

[75] Inventors: Nozomu Kitagishi, Tokyo; Kikuo Momiyama; Keiji Ikemori, both of Kanagawa; Sadatoshi Takahashi, Tokyo; Tsunefumi Tanaka, Kanagawa, all of Japan

[73] Assignee: Canon Kabushiki Kaisha, Tokyo, Japan

[21] Appl. No.: 657,762

[22] Filed: Oct. 4, 1984

[30] Foreign Application Priority Data

Oct. 6, 1983 [JP] Japan ................. 58-187398

[51] Int. Cl.$^4$ ............................ G02B 15/14
[52] U.S. Cl. ...................................... 350/427
[58] Field of Search ................. 350/423, 427

[56] References Cited

U.S. PATENT DOCUMENTS 4,359,270 11/1982 Okudaira ........................... 350/427
4,437,732 3/1984 Ishiyama ........................... 350/427

Primary Examiner—John K. Corbin
Assistant Examiner—Scott J. Sugarman
Attorney, Agent, or Firm—Toren, McGeady & Goldberg

[57] ABSTRACT

The disclosed zoom lens is composed of four lens groups. Counting from the front, the first lens group has a positive power, the second a negative power, the third a positive power and the fourth a positive or a negative power. At least the first, third and fourth lens groups are movable for zooming. The zoom lens satisfies the following conditions:

$$-3 < \beta 3w < -0.8$$

$$-0.35 < f3/f4 < 0.43$$

$$0.5 < Z2/Z < 1$$

$$1 < f1/fw < 1.7$$

$$0.3 < |f2|/fw < 0.48$$

where fi is focal length of the i-th lens group, Z2 is the amount of variation of the magnification power of the second lens group with zooming, $\beta 3W$ is the magnification power of the third lens group in the wide angle position, fw is the shortest focal length of the entire system, and Z is the zoom ratio of the entire system.

6 Claims, 10 Drawing Figures

HIGH RANGE ZOOM LENS

BACKGROUND OF THE INVENTION

1. Field of the Invention

This invention relates to high magnification range compact zoom lenses.

2. Description of the Prior Art

High range zoom lens proposed in Japanese Laid-Open Patent Applications Nos. SHO 57-161804 (published Oct. 3, 1982) and SHO 57-192917 (published November 27, 1982) are constructed with four lens groups all of which move at different speeds during zooming and have the advantage of extending the varifocal range. In particular, imparting a dependent movement into the frontmost or first lens group assists in promoting the magnification varying effect of the second lens group. A zoom lens having a high range but minimum bulk and size is thus achieved. In the zoom lens of Japanese Laid-Open Patent Application No. SHO 57-161804, however, the third lens group is positioned farther away from the image plane and has a weaker refractive power than the fourth lens group. Accordingly, the back-focal distance is unduly long, and, therefore, the entire lens system is long in the longitudinal direction. In Japanese Laid-Open Patent Application No. SHO 57-192917, on the other hand, the refractive powers of the third and fourth lens groups are both too strong to allow for good correction of aberrations with ease.

SUMMARY OF THE INVENTION

An object of the present invention is to provide a zoom lens of an extended range that still allows for a decrease in the total length of the lens, as well as a good correction of aberrations.

Another object of the invention is to suppress variation of the aberrations with zooming, particularly distortion and astigmatism.

Still another object of the invention is to moderate the decentering tolerance or the cam tolerance of the lens.

A further object of the invention is to shorten the minimum photographic distance.

DETAILED DESCRIPTION OF THE PREFERRED EMBODIMENTS

Figures 1A, 1B:
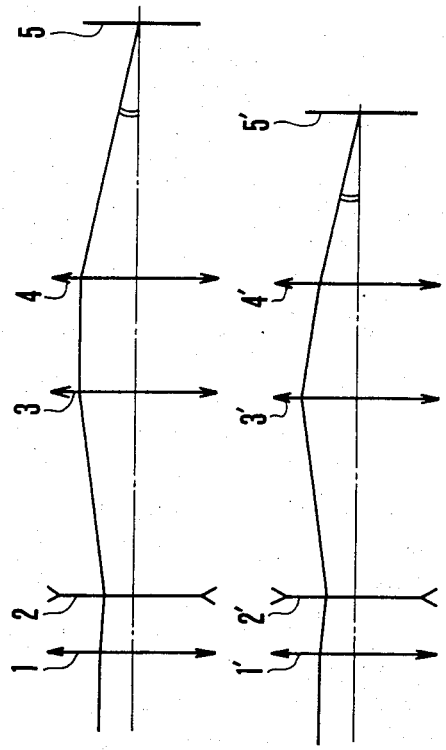
FIG. 1A is a diagram illustrating the basic optical arrangement of a prior known zoom lens.
FIG. 1B is similar to FIG. 1A, except that the present invention is illustrated.
Figure 2:
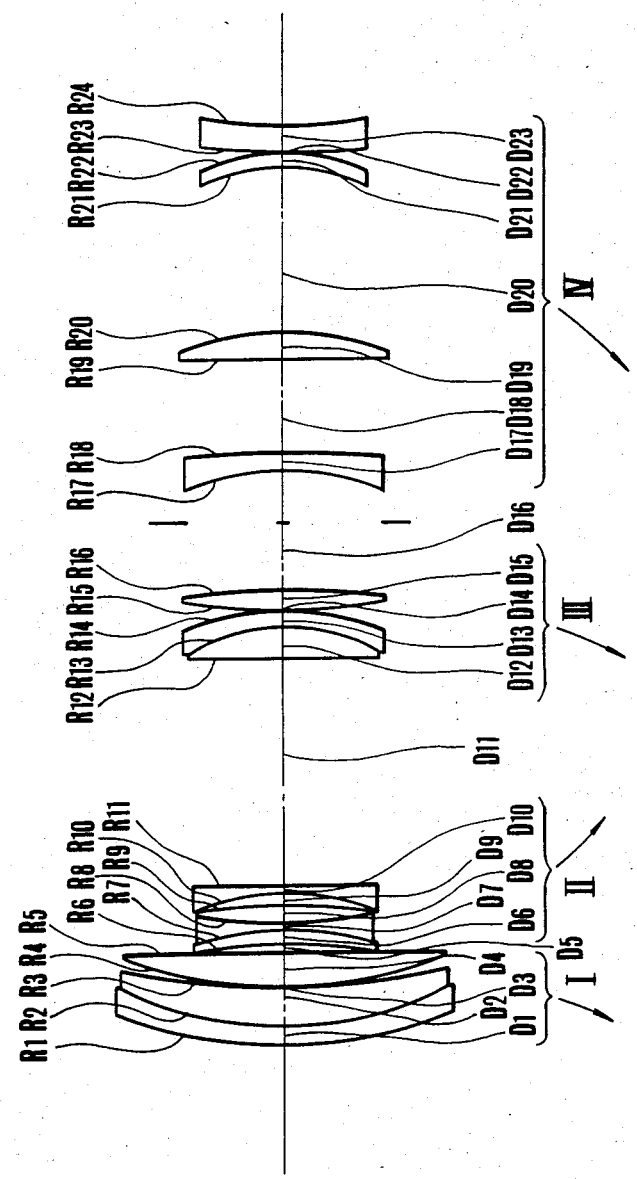
FIG. 2 is a longitudinal sectional view of a specific example 1 of a zoom lens of the invention.
Figure 3A:
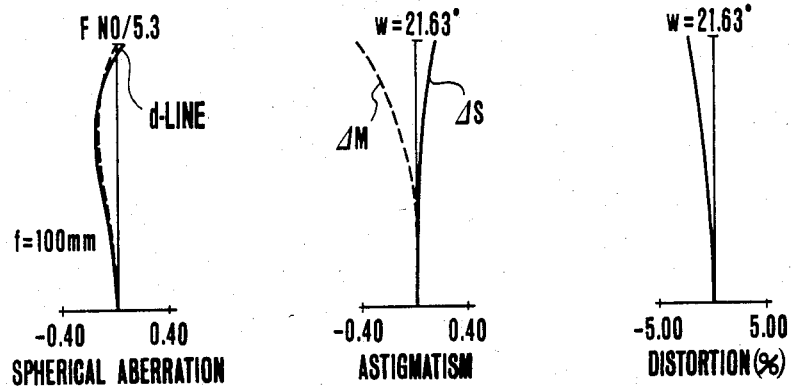
FIGS. 3(a), 3(b) and 3(c) are aberration curves of the lens of FIG. 2.
Figure 3B:
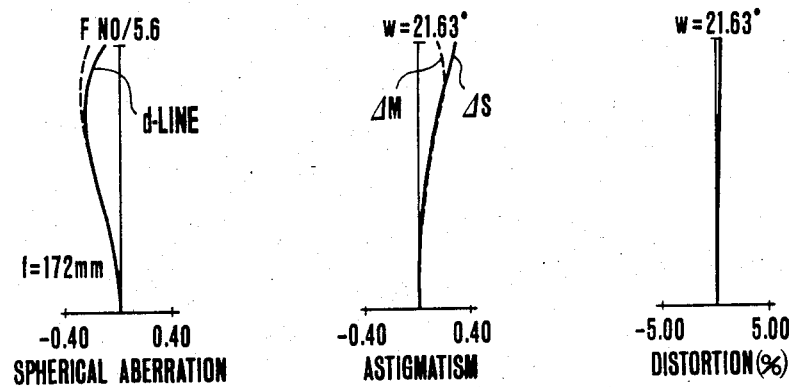
Figure 3C:
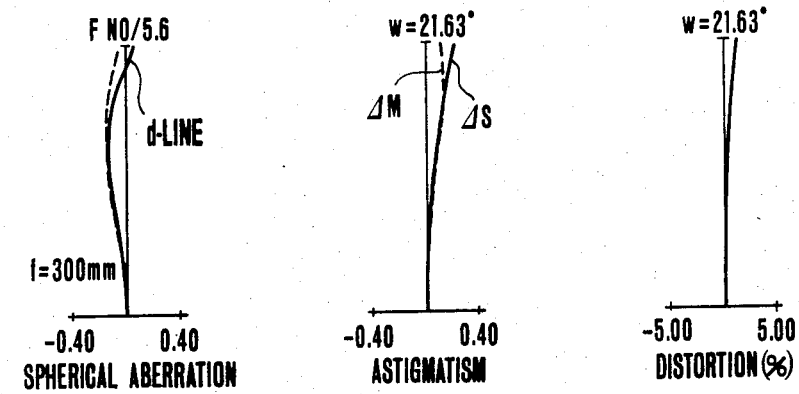
Figure 4:
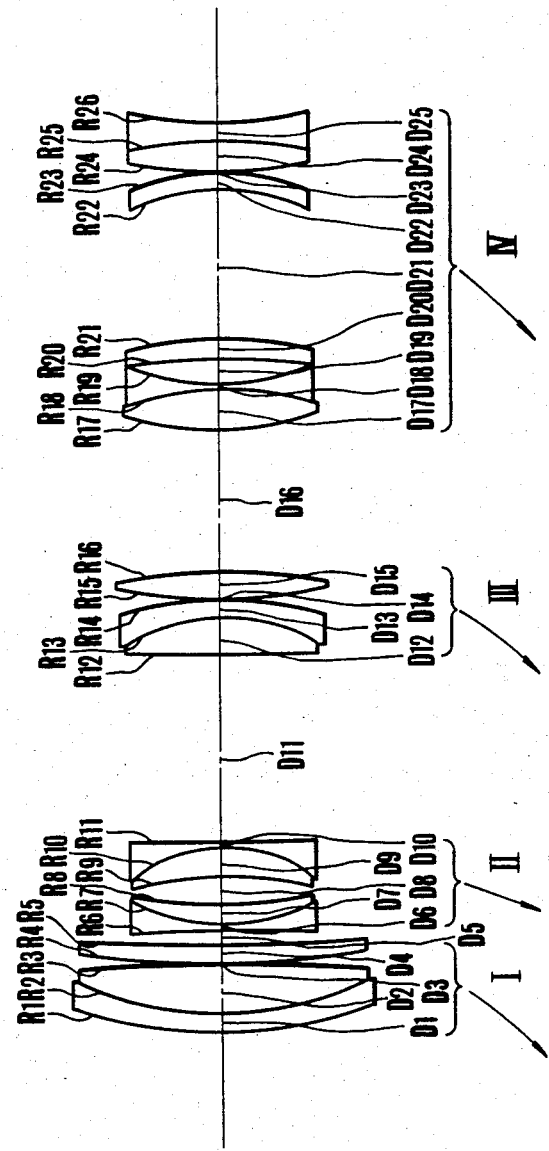
FIG. 4 is a longitudinal sectional view of another specific example 2 of a zoom lens of the invention.
Figure 5A:
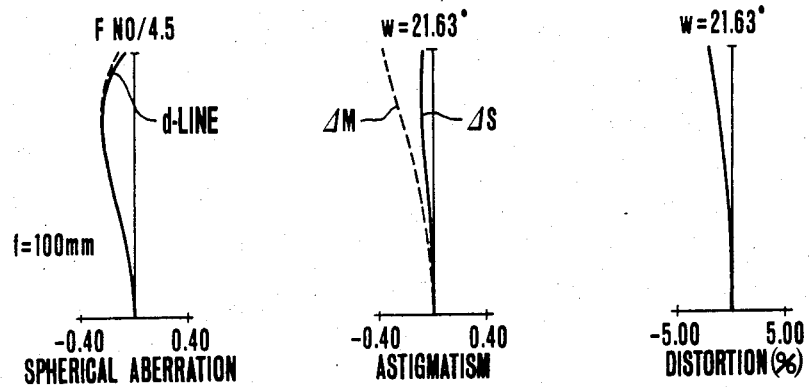
FIGS. 5(a), 5(b) and 5(c) are aberration curves of the lens of FIG. 4.
Figure 5B:
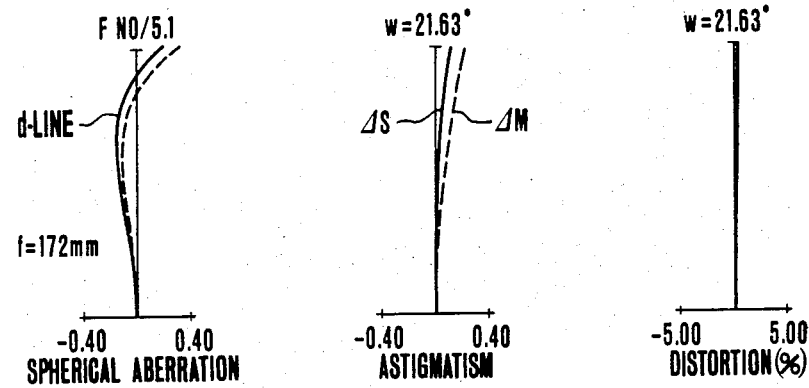
Figure 5C:
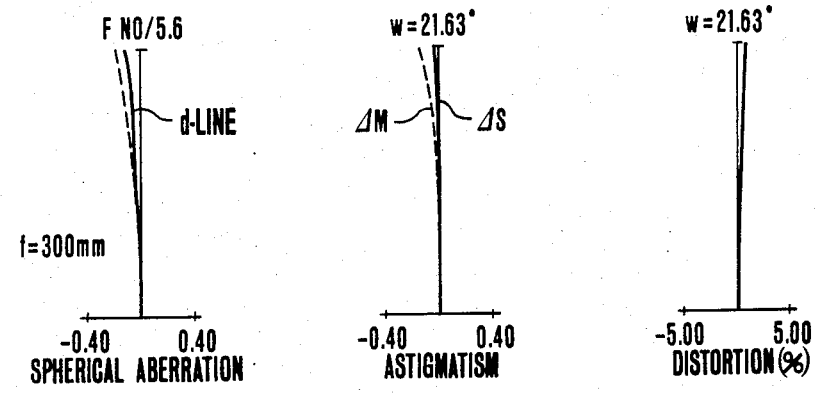

FIG. 2 and FIGS. 3(a), 3(b) and 3(c) show a zoom lens of the invention composes of, from front to rear, a first lens group I having a positive refractive power, a second lens group II having a negative refractive power, a third lens group III having a positive refractive power and a fourth lens group IV having a positive or negative refractive power. At least the first, third and fourth lens groups are moved in differential relation to effect zooming. The symbol fi denotes the focal length of the i-th lens groups, Z2 the range of variation with zooming of the magnification power of the second lens group, $\beta_{3W}$ the magnification power of the third lens group in the wide angle position, fw the shortest focal length for the entire system, and Z the zoom ratio of the entire system, with the following conditions being satisfied:

$$-3 < \beta_{3w} < -0.8 \quad (1)$$

$$-0.35 < f_3/f_4 < 0.43 \quad (2)$$

$$0.5 < Z_2/Z < 1 \quad (3)$$

$$1 < f_1/fw < 1.7 \quad (4)$$

$$0.3 < |f_2|/fw < 0.48 \quad (5)$$

The zoom lens according to the present invention employs a zoom type in which the first, third and fourth lens groups move to achieve a high varifocal range. In more detail, the first lens group is movable for zooming to promote the magnification power varying effect of the second lens group. This or the second lens group may either be held stationary or moved during zooming. However, if moved, the magnification power varying effect is greater. By moving the third and fourth lens groups during zooming, the range of variation of the image magnification is further extended. In the present invention, aberrations, despite the great increase in the zoom ratio, are corrected well by requiring the above-stated conditions (1) to (5) for design of the various lens groups.

Symbol $\beta_{3W}$ in condition (1) represents the magnification power of the third lens group in the wide angle position. By this rule of design, the degree of convergence of the rays of light emerging from the third group is limited. If this condition is satisfied, a shortening of the total length of the lens system is possible. This will be explained by comparing FIGS. 1A and 1B.

FIGS. 1A and 1B schematically illustrate the different courses the principal ray takes through all the lens groups between the conventional example as disclosed in Japanese Laid-Open Patent Applications Nos. SHO 56-133713, SHO 57-161804 and SHO 57-169716 and the present invention, after the numerical data for the first lens groups 1 and 1' and the second lens groups 2 and 2' are equalized with each other, in each group.

As can be understood from FIGS. 1A and 1B, the degree of convergence of the ray leaving the third lens group 3' of the invention shown in FIG. 1B is stronger than in the prior art shown in FIG. 1A. Accordingly, the back focal distance is shortened. Therefore, the total length of the lens system is correspondingly shortened. For adaptation to cameras having a flipping mirror, such as a single lens reflex camera, the back focal distance must be greater than a certain prescribed value. In the conventional example shown in FIG. 1A, however, the power distribution chosen provides a far longer back focal distance than necessary.

When the lower limit of condition (1) is exceeded, and unduly long back focal distance results, as has been mentioned above. Thus, a mimimization of the bulk and size of the zoom lens, which is one of the objects of the invention is difficult to achieve. Conversely, when the refractive power of the third lens group is stronger than the upper limit, it is difficult to correct well the variations of aberrations ascribable to the third lens group with zooming.

Condition (2) correct the distribution of refractive power between the third and fourth lens groups. Also, similarly to condition (1), this condition is effective in allowing the back focal distance to also take a proper value. There is still another purpose of advantageously shortening the length of the zoom section. In more detail, by decreasing the focal distance f3 of the third lens group to be smaller than that of the focal length f4 of the fourth lens group, the position of the principal point of a compound system of the third and fourth lens groups is shifted forward to thereby improve the design flexibility of the axial separation between the second and third lens groups. This then makes it possible to reduce the interval between the principal points of the second lens group and the aforementioned compound system. As a result, for the focal distance of the entire system to be taken at a prescribed value, the positive refractive power of the aforementioned compound system is strengthened. Therefore, the total axial movement is reduced resulting in an equivalence of the desired zoom ratio. Also the diameter of the front lens members is minimized.

When the upper limit of condition (2) is exceeded, the above-described effects diminish so that a compact zoom lens is difficult to achieve. The lower limit corresponds to where the refractive power of the fourth lens group is negative. When this lower limit is exceeded, a strong power distribution of an opposite sign between the third and fourth lens groups results, making it difficult to perform a good correction of aberrations.

It should be explained in relation to this that, in the present invention, the differential relation by which the fourth lens group moves axially to the other zoom lens groups is determined on the basis of not only smoothing the locus of the zooming movement of the compensator for the image shift to constantly maintain the position of the image plane or using the fourth lens group as the compensator, but also maintaining in a stable condition, chiefly the residual aberrations of the second and third lens groups throughout the zooming range. However, when the ratio of f3 to f4 increases in the negative direction below the lower limit of condition (2), good stability of the aberration correction is difficult to maintain even by adjusting modification if the locus of the zooming movement of the fourth lens group to any shape whatsoever.

Condition (3) defines a range of variation of the magnification power of the second lens group. When the lower limit is exceeded, the task of varying the magnification power by the third and fourth lens groups is so great that the range of variation of aberrations with zooming is objectionably increased, and the diameter of the aperature is too large. Conversely, when the magnification power varying duty of the second lens group is greater than the upper limit, the refractive powers of the first and second lens groups is too strong and the total zooming movement is too long to stabilize a good correction of aberration throughout the zooming range. The diameter of the front lens member also increases.

condition (4) defines a proper range of refractive powers for the first lens group. Strengthening of the refractive power of the first lens group beyond the lower limit results in the difficulty of correcting a spherical aberration, particularly in the telephoto positions. Also, letting $\beta_i$ denote the magnification power of the i-th lens group, the degree of sensitivity of decentering to the i-th lens group may be expressed as $(1-\beta_i)\cdot\beta_{i+1}\cdot\beta_{i+2}\ldots\beta_N$, and the degree of sensitivity of the position error to the i-th lens group as $(1-\beta_i^2)\cdot\beta_{i+1}^2\ldots\beta_N^2$. For an infinite object distance, because $\beta_i=0$, the degree of sensitivity of the decentering becomes $\beta_2\cdot\beta_3\cdot\beta_4$ and the degree of sensitivity of the position error becomes $\beta_2^2\cdot\beta_3^2\cdot\beta_4^2$. Since $fT=f1\cdot\beta_2\cdot\beta_3\cdot\beta_4$, where fT is the longest focal length of the entire system, as will be seen from $\beta_2\cdot\beta_3\cdot\beta_4=fT/f1$, the degree of sensitivity of the decentering and the degree of sensitivity of the position error increase with decrease of the focal length of the first lens group. When the lower limit of condition (4) is exceeded, therefore, the decentering tolerance and the cam tolerance become very severe, making it difficult to economically manufacture a production run of lenses. When the upper limit is exceeded, the total focusing movement is too long to shorten the minimum object distance. Also, the second lens group, in the wide angle positions, reacts as a reduction system whose absolute value of magnification power is small. In order to satisfy condition (3), therefore, the total zooming movement of the second lens group is necessarily increased, thereby giving rise to a disadvantage that the physical length of the lens is increased.

Condition (5) defines a range of refractive powers for the second lens group. When the lower limit is exceeded, the aberrational problem, particularly with respect to the variation of distortion and astigmatism, is difficult. When the refractive power of the second lens group is weakened beyond the upper limit, the total length of the lens increases.

Though the above-stated principle of zoom lens design suffices for accomplishing the objects of the present invention, a further improvement of the aberration correction may be achieved by satisfying the following conditions:

The second lens group includes at least two cemented doublets, each in the bi-concave form, and the refractive power of each of their cemented lens surfaces is positive, thereby giving an advantage that the chromatic aberrations are well stabilized against zooming, and distortion and spherical aberrations are also well corrected.

Preferably, the fourth lens group includes a multiplicity of lenses. These lenses are designed such that as they are divided into front and rear parts at the longest of the air spacings between the successive two lenses, as the boundary, the front part includes at least one meniscus-shaped positive lens of rearward convexity. More specifically, this meniscus lens is shaped to satisfy the following relationship for the radii of curvatures $R_A$ and $R_B$ of the front and rear surfaces thereof:

$$-5 < [(R_B+R_A)/(R_B-R_A)] < -1$$

This produces good stability of spherical and comatic aberration correction throughout the zooming range.

The zoom lens according to the invention has its focusing provision at the first lens group, as it is preferred from the standpoint of minimizing the variation of aberrations throughout the focusing range.

As has been described above, according to the present invention, when the above-defined specific requirements are fulfilled within the framework of the general requirements, a zoom lens of a compact form, which still maintains a high grade imaging performance throughout the zooming range, is achieved. Particularly, with condition (1) satisfied, the third lens group gives off a light bundle to convergence, causing the averrations to vary as the third and fourth lens groups move axially in differential relation to each other. This variation is positively utilized to assist in the stabilization of the aberrations of the entire system. That is, the fact that all the lens groups are moved in a differential relation when zooming implies that the focal length of the entire system not only varies while constantly maintaining the position of the image plane, but also that image aberrations are stabilized against zooming. Thus, the present invention provides the possibility of making the most of the design flexibility and characteristics of that zoom type which has three or more zoom components.

Also, when the focal lengths f1, f2, f3 and f4 take the proper values as specified in the present invention, further aid in a good correction of aberrations is obtained.

Two examples of specific zoom lenses of the invention can be constructed in accordance with the numerical data given in the following tables for the radii of curvature, R, the axial thicknesses and air separations, D, the refractive indices, N, and the Abbe numbers, $\nu$, of the glasses of the lens elements, with the subscripts numbered consecutively from front to rear.

Numerical Example 1
F = 100  FNO = 1:5.3~5.6  2ω = 24.4°~8.2°

| R 1 = 79.88 | D 1 = 3.00 | N 1 = 1.80518 | ν 1 = 25.4 |
|---|---|---|---|
| R 2 = 58.28 | D 2 = 6.00 | N 2 = 1.48749 | ν 2 = 70.1 |
| R 3 = 120.21 | D 3 = 0.20 | | |
| R 4 = 76.71 | D 4 = 5.50 | N 3 = 1.48749 | ν 3 = 70.1 |
| R 5 = −968.74 | D 5 = Variable | | |
| R 6 = −87.77 | D 6 = 2.40 | N 4 = 1.84666 | ν 4 = 23.9 |
| R 7 = −48.21 | D 7 = 1.00 | N 5 = 1.69680 | ν 5 = 55.5 |
| R 8 = 92.49 | D 8 = 2.97 | | |
| R 9 = −74.47 | D 9 = 2.10 | N 6 = 1.80518 | ν 6 = 25.4 |
| R10 = −37.90 | D10 = 1.00 | N 7 = 1.77250 | ν 7 = 49.6 |
| R11 = 2093.90 | D11 = Variable | | |
| R12 = 890.34 | D12 = 5.30 | N 8 = 1.49700 | ν 8 = 81.6 |
| R13 = −29.58 | D13 = 2.40 | N 9 = 1.84666 | ν 9 = 23.9 |
| R14 = −41.36 | D14 = 0.10 | | |
| R15 = 90.00 | D15 = 3.30 | N10 = 1.48749 | ν10 = 70.1 |
| R16 = −122.55 | D16 = Variable | | |
| R17 = −39.46 | D17 = 2.50 | N11 = 1.61405 | ν11 = 55.0 |
| R18 = −197.33 | D18 = 14.90 | | |
| R19 = −402.20 | D19 = 4.00 | N12 = 1.77250 | ν12 = 49.6 |
| R20 = −49.56 | D20 = 25.81 | | |
| R21 = −31.89 | D21 = 2.00 | N13 = 1.77250 | ν13 = 49.6 |
| R22 = −36.55 | D22 = 0.10 | | |
| R23 = 224.31 | D23 = 4.00 | N14 = 1.63636 | ν14 = 35.4 |
| R24 = 74.00 | | | |

| | f | | |
|---|---|---|---|
| | 100 | 172 | 300 |
| D 5 | 1.28 | 28.98 | 56.69 |
| D11 | 36.91 | 20.42 | 3.92 |
| D16 | 19.46 | 27.69 | 2.28 |

Numerical Example 2
F = 100  FNO = 1:4.5~5.6  2ω = 24.4°~8.2°

| R 1 = 89.16 | D 1 = 3.00 | N 1 = 1.80518 | ν 1 = 25.4 |
|---|---|---|---|
| R 2 = 58.75 | D 2 = 9.00 | N 2 = 1.51633 | ν 2 = 64.1 |
| R 3 = −349.68 | D 3 = 0.20 | | |
| R 4 = 167.47 | D 4 = 3.50 | N 3 = 1.48749 | ν 3 = 70.1 |
| R 5 = 462.40 | D 5 = Variable | | |
| R 6 = −264.41 | D 6 = 1.00 | N 4 = 1.72000 | ν 4 = 50.2 |
| R 7 = 32.86 | D 7 = 3.60 | N 5 = 1.84666 | ν 5 = 23.9 |
| R 8 = 68.29 | D 8 = 5.26 | | |
| R 9 = −56.21 | D 9 = 5.00 | N 6 = 1.83400 | ν 6 = 37.2 |
| R10 = −25.57 | D10 = 1.00 | N 7 = 1.77250 | ν 7 = 49.6 |
| R11 = 527.75 | D11 = Variable | | |
| R12 = 1254.01 | D12 = 7.03 | N 8 = 1.53996 | ν 8 = 59.5 |
| R13 = −32.93 | D13 = 3.18 | N 9 = 1.84666 | ν 9 = 23.9 |
| R14 = −62.40 | D14 = 0.13 | | |
| R15 = 108.31 | D15 = 4.38 | N10 = 1.57309 | ν10 = 42.6 |
| R16 = −141.91 | D16 = Variable | | |
| R17 = 62.90 | D17 = 6.00 | N11 = 1.57501 | ν11 = 41.5 |
| R18 = −87.67 | D18 = 2.00 | N12 = 1.66755 | ν12 = 41.9 |
| R19 = 54.82 | D19 = 3.49 | | |
| R20 = −136.05 | D20 = 4.00 | N13 = 1.77250 | ν13 = 49.6 |
| R21 = −73.19 | D21 = 25.91 | | |
| R22 = −38.46 | D22 = 3.00 | N14 = 1.77250 | ν14 = 49.6 |
| R23 = −42.25 | D23 = 0.10 | | |
| R24 = 67.31 | D24 = 5.50 | N15 = 1.64000 | ν15 = 60.1 |
| R25 = −89.08 | D25 = 3.00 | N16 = 1.51742 | ν16 = 52.4 |
| R26 = 51.59 | | | |

| | f | | |
|---|---|---|---|
| | 100 | 172 | 300 |
| D 5 | 2.49 | 26.08 | 44.61 |
| D11 | 34.69 | 19.10 | 1.30 |
| D16 | 26.27 | 18.74 | 18.36 |

What is claimed is:
1. A zoom lens comprising:
from front to rear, a first lens group having a positive refractive power;
a second lens group having a negative refractive power;
a third lens group having a positive refractive power; and
a fourth lens group, at least said first, said third and said fourth lens groups being movable for zooming, and said zoom lens satisfying the following conditions:

$$-3 < \beta_{3w} < -0.8$$

$$-0.35 < f3/f4 < 0.43$$

$$0.5 < Z2/Z < 1$$

$$1 < f1/fw < 1.7$$

$$0.3 < |f2|/fw < 0.48$$

wherein
fi is the focal length of the i-th lens group counting from the front;
Z2 is the range of variation with zooming of the magnification power of said second lens group;
$\beta_{3w}$ is the magnification power of said third lens group in a wide angle position;
fw is the shortest focal length of the entire system; and
Z is the zoom ratio of the entire system.

2. A zoom lens according to claim 1, wherein said second lens group moves simultaneously with said first, third and fourth lens groups to effect zooming.

3. A zoom lens according to claim 1, wherein the refractive power of said fourth lens group is positive.

4. A zoom lens according to claim 1, wherein the refractive power of said fourth lens group is negative.

5. A zoom lens according to claim 1, wherein said second lens group includes at least two cemented lenses each composed of two elements having surfaces cemented together, both surfaces of each of said cemented lenses are concave, and said cemented surface has a positive refractive power.

6. A zoom lens according to claim 1, wherein said fourth lens group includes a plurality of lenses divided into a front group and a rear group at the longest of the air spaces between successive two lenses, and said front group has at least one meniscus shaped positive lens convex in the rearward direction.

* * * * *